US012560127B2

(12) United States Patent
Cossetti et al.

(10) Patent No.:  US 12,560,127 B2
(45) Date of Patent:  Feb. 24, 2026

(54) METHOD FOR CONTROLLING A POWER PLANT OF A ROTORCRAFT COMPRISING AT LEAST TWO TURBOSHAFT ENGINES

(71) Applicant: AIRBUS HELICOPTERS, Marignane (FR)

(72) Inventors: Luca Cossetti, Alleins (FR); Francois Malburet, Coudoux (FR)

(73) Assignee: AIRBUS HELICOPTERS, Marignane Cedex (FR)

( * ) Notice: Subject to any disclaimer, the term of this patent is extended or adjusted under 35 U.S.C. 154(b) by 373 days.

(21) Appl. No.: 17/517,858

(22) Filed: Nov. 3, 2021

(65) Prior Publication Data

US 2022/0135239 A1     May 5, 2022

(30) Foreign Application Priority Data

Nov. 4, 2020   (FR) ...................................... 2011299

(51) Int. Cl.
    *F02C 9/42*        (2006.01)
    *B64C 27/00*     (2006.01)
           (Continued)

(52) U.S. Cl.
    CPC ................ *F02C 9/42* (2013.01); *B64C 27/00* (2013.01); *B64D 27/10* (2013.01); *B64D 27/34* (2024.01);
           (Continued)

(58) Field of Classification Search
    CPC ........ B64D 31/00; B64D 27/10; B64D 27/26; B64D 35/08; F02C 6/00; F02C 6/02; F02C 6/20
    See application file for complete search history.

(56) References Cited

U.S. PATENT DOCUMENTS

| | | | | | |
|---|---|---|---|---|---|
| 3,869,862 | A | * | 3/1975 | Dickey | F02C 6/02 |
| | | | | | 244/17.11 |
| 4,488,236 | A | * | 12/1984 | Morrison | F02C 9/28 |
| | | | | | 701/99 |

(Continued)

FOREIGN PATENT DOCUMENTS

| | | |
|---|---|---|
| EP | 1990519 A2 | 11/2008 |
| EP | 1990519 A3 | 5/2012 |

(Continued)

OTHER PUBLICATIONS

French Search Report for French Application No. FR2011299, Completed by the French Patent Office, Dated Jul. 16, 2021, 9 pages.

*Primary Examiner* — Phutthiwat Wongwian
*Assistant Examiner* — Jacek Lisowski
(74) *Attorney, Agent, or Firm* — Brooks Kushman P.C.

(57) ABSTRACT

A method for controlling at least a first turboshaft engine and a second turboshaft engine of a rotorcraft, which set a common kinematic linkage in motion, the rotorcraft having an output electric machine cooperating with a first output kinematic linkage of the first turboshaft engine, the rotorcraft having an input electric machine cooperating with a gas generator of the second turboshaft engine. The method includes the following steps: supplying fuel to the first turboshaft engine, operating the output electric machine in electrical energy generator mode, supplying fuel to the second turboshaft engine, and operating the input electric machine in motor mode in order to supply a second non-zero power to said common kinematic linkage.

18 Claims, 2 Drawing Sheets

(51) Int. Cl.

| | | |
|---|---|---|
| *B64D 27/10* | (2006.01) | |
| *B64D 27/34* | (2024.01) | |
| *B64D 31/18* | (2024.01) | |
| *B64D 37/00* | (2006.01) | |
| *F02C 7/22* | (2006.01) | |

(52) U.S. Cl.
CPC ........... *B64D 31/18* (2024.01); *B64D 37/005* (2013.01); *F02C 7/22* (2013.01); *F05D 2220/329* (2013.01)

(56) References Cited

U.S. PATENT DOCUMENTS

| | | | |
|---|---|---|---|
| 2010/0058731 A1* | 3/2010 | Haehner ................ | F01D 15/10 |
| | | | 290/46 |
| 2016/0237917 A1 | 8/2016 | Marconi et al. | |
| 2016/0333782 A1 | 11/2016 | Morgan | |
| 2017/0175856 A1* | 6/2017 | Beddok .................. | B64C 27/12 |
| 2017/0226933 A1 | 8/2017 | Klonowski et al. | |

FOREIGN PATENT DOCUMENTS

| | | | |
|---|---|---|---|
| EP | 2602458 A2 | 6/2013 | |
| EP | 2602458 A3 | 10/2016 | |
| EP | 3415436 A1 | 12/2018 | |
| EP | 3783211 A1 | 2/2021 | |
| FR | 3024707 A1 | 2/2016 | |
| WO | 2015052413 A1 | 4/2015 | |
| WO | 2015145036 A1 | 10/2015 | |

* cited by examiner

METHOD FOR CONTROLLING A POWER PLANT OF A ROTORCRAFT COMPRISING AT LEAST TWO TURBOSHAFT ENGINES

CROSS REFERENCE TO RELATED APPLICATIONS

This application claims priority to French patent application No. FR 20 11299 filed on Nov. 4, 2020, the disclosure of which is incorporated in its entirety by reference herein.

TECHNICAL FIELD

The present disclosure relates to a method for controlling a power plant of a rotorcraft comprising at least two turboshaft engines, and the associated rotorcraft.

BACKGROUND

A rotorcraft may comprise a power plant provided with at least two turboshaft engines. For example, a rotorcraft may comprise such a power plant for setting at least one rotor in motion.

A turboshaft engine usually comprises a gas generator and at least one power turbine. The gas generator is provided with at least one compressor, a combustion chamber and an expansion turbine connected to the compressor by a connecting shaft. The power turbine may be free, i.e., mechanically disengaged from the gas generator in rotation, being rotated by the gases exiting the gas generator. In addition, the power turbine mechanically rotates an output shaft of the turboshaft engine, directly or indirectly.

The specific fuel consumption of a turboshaft engine tends to decrease as the power generated by this turboshaft engine increases, at least as long as the power remains below an upper threshold. As a result, when the turboshaft engine generates high power, the specific fuel consumption of this turboshaft engine decreases.

In a conventional rotorcraft comprising at least two turboshaft engines setting in motion one or more rotors, and in particular a rotary wing, the power necessary for setting the rotor or rotors in motion is provided jointly by the turboshaft engines. The total power supplied to the rotor or rotors is substantially equal to the sum of the power generated by the turboshaft engines, minus the energy losses of the kinematic linkages and the power taken off to drive accessories.

The turboshaft engines are sized to make the flight safe in the event of a worst-case flight scenario, for example following a total failure of a turboshaft engine during take-off.

In this context, the turboshaft engines of such a rotorcraft can, during certain flight phases, for example level flight, generate a relatively moderate amount of power, far from their maximum power. As a result, the specific fuel consumption of these turboshaft engines is not optimal during these flight phases.

Document WO 2015/052413 describes a method for optimizing the specific fuel consumption of a helicopter equipped with two turboshaft engines. This method consists in operating a first turboshaft engine in continuous flight mode, a second turboshaft engine then being in a so-called "super slow" mode with zero power and with the combustion chamber lit. This super-slow mode is assisted by mechanical rotation of the connecting shaft of the gas generator of the second turboshaft engine. This mechanical rotation is produced with an electric motor, or a mechanical drive device coupled to the gas generator of the first turboshaft engine or to the rotor of the helicopter, or a mechanical drive device operating with a power source such as a hydraulic or pneumatic source.

Document FR 3 024 707 describes a system comprising at least one turboshaft engine that is also capable of being put on standby in flight. Each turboshaft engine comprises a gas generator that cooperates with an electric machine capable of operating in motor mode and in electrical energy generator mode. Each electric machine is connected to an on-board electrical energy supply network and to at least one non-rechargeable primary electrical energy storage device that can be used only once. The on-board network is connected to at least one alternator set in motion by a gearbox.

In a twin-engine rotorcraft, one turboshaft engine may operate normally while the other turboshaft engine is put on standby. The primary electrical energy storage device may be activated by an activation means in order to provide the electric machine connected with the turboshaft engine on standby with the energy necessary for it to be reactivated quickly.

Document US 2016/0333782 describes an aircraft having two turboshaft engines. A first electric machine is arranged on the high-pressure stage of the gas compressor of each turboshaft engine and a second electric machine is arranged on the shaft of the free turbine of each turboshaft engine. During cruise flight, a first turboshaft engine is used to provide the mechanical power necessary to drive a gearbox while the other turboshaft engine is idled. In these conditions, a controller can transfer the electrical energy extracted by the second electric machine from the operating turboshaft engine to the first electric machine integrated into the idling engine.

The above solutions are therefore aimed, in particular, at switching a turboshaft engine of a two-engine installation to idle speed.

Documents EP 2 602 458 A2, EP 3 783 211 A1, EP 1 990 519 A2, EP 3 415 436 A1 and WO 2015/145036 are also known.

SUMMARY

An object of the present disclosure is therefore to propose a method that aims to optimize the specific fuel consumption of at least one turboshaft engine of a rotorcraft comprising at least two turboshaft engines.

The disclosure relates to a method for controlling at least two turboshaft engines of a rotorcraft and, in particular, a first turboshaft engine and a second turboshaft engine of a rotorcraft that set a common kinematic linkage in motion respectively via a first output kinematic linkage and a second output kinematic linkage, the first turboshaft engine having a first free turbine connected to the first output kinematic linkage, said rotorcraft having an output electric machine operating on request at least in electrical energy generator mode, being driven by the first output kinematic linkage, the rotorcraft having an input electric machine operating on request at least in motor mode, the input electric machine being connected by an input kinematic linkage to a gas generator of the second turboshaft engine.

The method comprises a phase with an optimized specific fuel consumption comprising the following steps:
  supplying fuel to the first turboshaft engine in order to supply a first non-zero power to said common kinematic linkage;
  operating the output electric machine in electrical energy generator mode in order to generate electrical energy; and supplying fuel to the second turboshaft engine and operating the input electric machine in motor mode in order to supply a second non-zero power to said common kinematic linkage. Thus, in at least one embodiment, neither of the first and second turboshaft engines is idling in this phase.

For certain flight phases and, for example, during level forward flight, the power required to drive the common kinematic linkage is less than the total power that can be generated jointly by the turboshaft engines.

According to some prior art documents, one turboshaft engine is operated at a relatively high speed and the other turboshaft engine is idled.

The disclosure follows another strategy.

Indeed, according to the disclosure, the first turboshaft engine is operated in such a way as to generate a high output power, for example relatively close to its maximum power and determined in order to optimize its specific fuel consumption. The first turboshaft engine is not in an idle operating mode during which it does not provide drive power to said common kinematic linkage, instead providing a first non-zero power to said common kinematic linkage. This method thus makes it possible to obtain a first saving through optimized specific fuel consumption in the first turboshaft engine. For example, the high output power is a stored power and/or is greater than or equal to a threshold power or a power that lies within a stored power range.

However, not all of the high output power is transmitted to the common kinematic linkage, meaning that the common kinematic linkage is also set in motion by the second turboshaft engine. Indeed, a portion of the output power is taken off by the output electric machine in order to generate electrical energy. Therefore, only another portion of the output power referred to as "first power" is transmitted to the common kinematic linkage. The first power is less than the power needed to drive the common kinematic linkage in the present flight scenario.

The second turboshaft engine then supplies a second non-zero power to said common kinematic linkage, unlike an engine on standby. The second turboshaft engine is not in an idle operating mode during which it does not provide drive power to said common kinematic linkage, instead providing a second non-zero power to said common kinematic linkage. The sum of the first power and the second power is equal to the power needed to drive the common kinematic linkage in the present flight scenario. For example, the second power may be less than or equal to the first power. For this purpose, the input electric machine is activated to operate in motor mode in order to help drive the gas generator of the second turboshaft engine. Thus, in at least one embodiment, neither of the first and second turboshaft engines is idling during this phase.

The contribution of the input electric machine thus makes it possible to reduce the flow rate of fuel supplied to the second turboshaft engine in order to supply the required second power. The temperature of the gases at the gas generator outlet is consequently reduced. This operation therefore results in a second saving through reduced fuel consumption and reduced carbon dioxide emissions.

This method thus proposes to implement asymmetry in the use of the turboshaft engines. Indeed, the first turboshaft engine is controlled to provide a high output power in order to operate at an operating point that results in optimized specific fuel consumption, and drives an output electric machine to consume a portion of the additional power produced, while the second turboshaft engine is assisted by the input electric machine to operate at an operating point that results in reduced consumption and reduced pollution.

The method may also include one or more of the following features.

Each turboshaft engine may comprise its own input electric machine cooperating with its gas generator and its own output electric machine cooperating with its output kinematic linkage. Each turboshaft engine can thus represent the first turboshaft engine or the second turboshaft engine described previously, as required.

During the phase with optimized specific fuel consumption, the input electric machine of the turboshaft engine acting as the first turboshaft engine is not active, i.e., it does not operate in electrical energy generator mode, or even in motor mode.

According to a possibility compatible with the preceding possibility, the first turboshaft engine and the second turboshaft engine may be different and may generate different maximum powers.

According to a possibility compatible with the preceding possibilities, said first power may be equal to an original power supplied to said common kinematic linkage by the first turboshaft engine prior to an initiation of said phase with optimized specific fuel consumption, said output electric machine being inactive prior to said initiation of said phase with optimized specific fuel consumption.

The expression "said output electric machine being inactive" means that the output electric machine does not operate in electrical energy generator mode, or even in motor mode.

Thus, during the phase with optimized specific fuel consumption, the first turboshaft engine may receive more fuel in order to produce additional power and operate more efficiently. On the other hand, all the additional power is used by the output electric machine to produce electrical energy.

According to a possibility compatible with the preceding possibilities, said second power may be equal to an initial power supplied to said common kinematic linkage by the second turboshaft engine upon said initiation of said phase with optimized specific fuel consumption, said input electric machine being inactive prior to the initiation of said phase with optimized specific fuel consumption.

The expression "said input electric machine being inactive" means that the input electric machine does not operate in motor mode, or even in electrical energy generator mode.

Thus, upon said initiation of said phase with optimized specific fuel consumption, the second turboshaft engine supplies the same power as previously to the common kinematic linkage. However, the second turboshaft engine is for this purpose henceforth assisted by the associated input electric machine. The flow rate of fuel supplied to the second turboshaft engine is therefore reduced.

According to a possibility compatible with the preceding possibilities, said common kinematic linkage is set in motion jointly by said first turboshaft engine and said second turboshaft engine during said phase with optimized specific fuel consumption.

According to a possibility compatible with the preceding possibilities, during said operation of the input electric machine in motor mode, at least a portion of said electrical energy supplies said input electric machine with electricity.

Some or all of the electrical energy created by transforming mechanical power taken from the first output kinematic linkage may be transmitted by an electrical connection to the input electric machine. By electrically supplying the input electric machine with all the electrical energy produced by the output electric machine, the method avoids an electrical energy storage problem.

According to one possibility, at least a portion of the electrical energy produced by the output electric machine may be stored in at least one conventional reversible electrical energy storage device. For example, the stored electrical energy can later be used to obtain additional power by means of an electric machine driving the gas generator or the output kinematic linkage of a turboshaft engine.

According to a possibility compatible with the preceding possibilities, said output electric machine may also, for example, operate in motor mode.

Thus, the method of the disclosure may include an assistance phase that is separate from the phase with optimized specific fuel consumption during which the output electric machine operates in motor mode.

In addition to a method, the disclosure relates to a rotorcraft provided with at least a first turboshaft engine and a second turboshaft engine that set a common kinematic linkage in motion respectively via a first output kinematic linkage and a second output kinematic linkage, the first turboshaft engine having a first free turbine connected to the first output kinematic linkage, the common kinematic linkage setting at least one rotary wing in motion, said rotorcraft having an output electric machine operating on request at least in electrical energy generator mode, being driven by the first output kinematic linkage, the rotorcraft having an input electric machine operating on request at least in motor mode, the input electric machine being connected by an input kinematic linkage to a gas generator of the second turboshaft engine.

The rotorcraft includes an assistance system configured to implement the method of the disclosure.

According to one possibility, the first turboshaft engine may comprise an additional input machine operating on request at least in motor mode, the additional input machine being connected by an additional input kinematic linkage to a gas generator of the first turboshaft engine, and the second turboshaft engine comprises an additional output machine operating at least in electrical energy generator mode, being driven by the second output kinematic linkage.

Naturally, the method described above can be implemented using the additional machines.

According to a possibility compatible with the preceding possibility, said output electric machine may be configured to operate in a motor mode.

According to a possibility compatible with the preceding possibilities, said additional output machine may be configured to operate in a motor mode.

According to a possibility compatible with the preceding possibilities, said system may comprise:
  a controller controlling the output electric machine and the input electric machine or, if required, the additional input machine and the additional output machine;
  a first fuel metering valve commanded by the controller to supply fuel to the first turboshaft engine; and
  a second fuel metering valve commanded by the controller to supply fuel to the second turboshaft engine.

The term "controller" may denote equipment including a single entity or several entities. For example, the controller may comprise one entity per turboshaft engine, usually referred to as the ECU (Engine Control Unit). One of the ECU entities or another computer can then implement the method upon the order of a pilot or when predetermined conditions are fulfilled, for example.

BRIEF DESCRIPTION OF THE DRAWINGS

The disclosure and its advantages appear in greater detail in the context of the following description of embodiments given by way of illustration and with reference to the accompanying figures, in which.

DETAILED DESCRIPTION

Elements that are present in more than one of the figures are given the same references in each of them.

Figure 1:
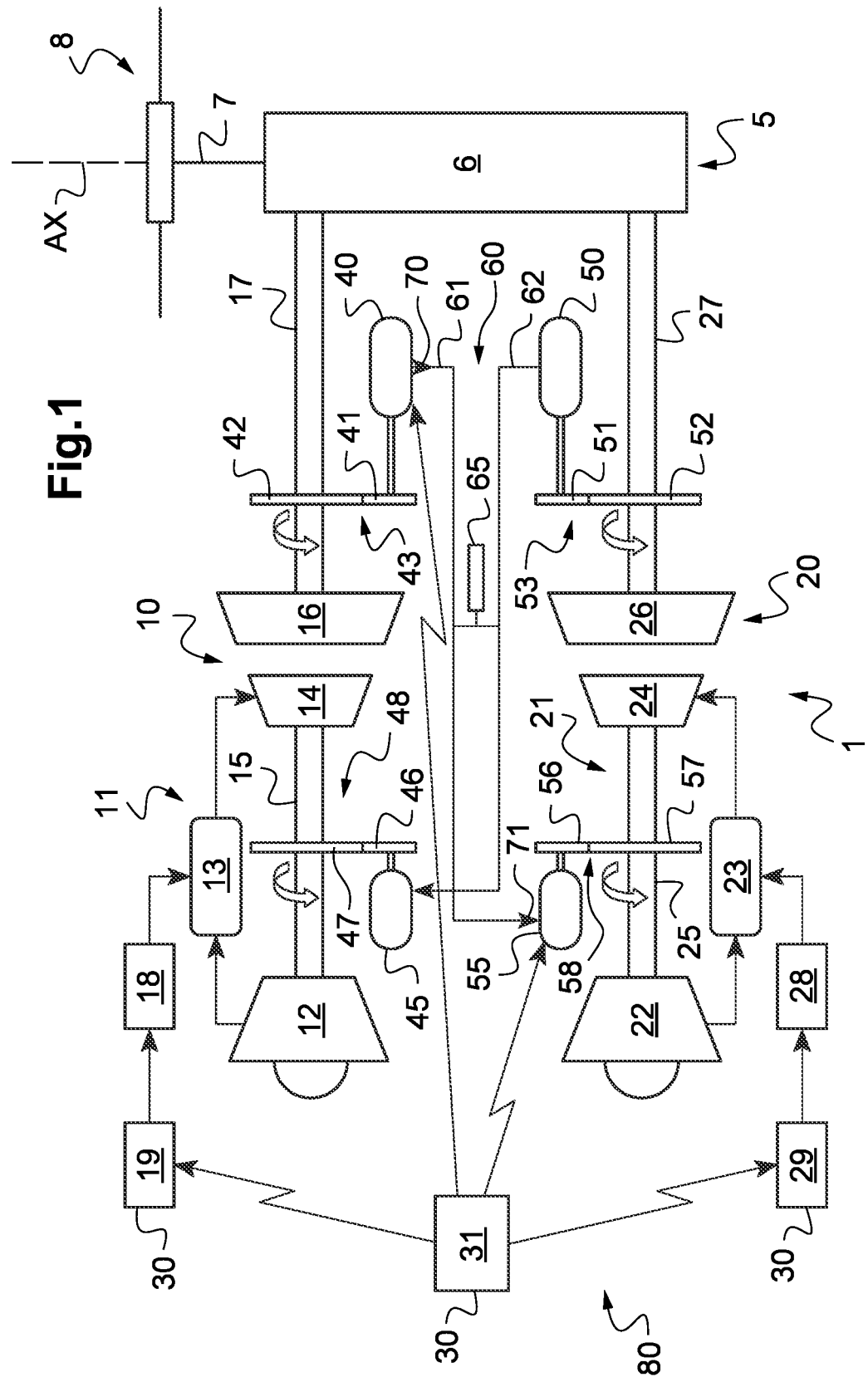
FIG. 1 is a diagram of a rotorcraft according to the disclosure.

FIG. 1 shows a rotorcraft 1 according to the disclosure.

The rotorcraft 1 includes a power plant comprising several turboshaft engines for setting a kinematic linkage 5 in motion. The kinematic linkage is referred to for convenience as a "common kinematic linkage 5" insofar as it is set in motion by a plurality of turboshaft engines of the power plant.

By way of example, the common kinematic linkage 5 may comprise a rotary wing 8. In particular, the common kinematic linkage 5 may comprise a gearbox 6 rotating, in particular, a rotor mast 7 about an axis of rotation AX, the rotor mast 7 rotating the rotary wing 8.

The power plant thus comprises a first turboshaft engine 10 setting in motion a first output kinematic linkage 17 which leads to the common kinematic linkage 5. The power plant also comprises a second turboshaft engine 20 setting in motion a second output kinematic linkage 27 which leads to the common kinematic linkage 5.

Unless otherwise indicated, the term "first" refers hereinafter to a component of the first turboshaft engine 10 or cooperating with the first turboshaft engine 10, in order to distinguish it from other components of the same type. Conversely, the term "second" refers hereinafter to a component of the second turboshaft engine 20 or cooperating with the second turboshaft engine 20, in order to distinguish it from other components of the same type.

Each turboshaft engine comprises a gas generator and a power turbine, of the free turbine type according to the example.

The first turboshaft therefore usually comprises a first gas generator 11 provided with at least one first compressor 12 connected by a first inner shaft 15 to at least one first high-pressure turbine 14. The first gas generator 11 further comprises a first combustion chamber 13 fluidly interposed between the first compressor 12 and the first high-pressure turbine 14. The first combustion chamber 13 is connected to a fuel supply network comprising a first fuel metering valve 18. The first fuel metering valve 18 may be controlled by a first engine computer 19. In addition, the first turboshaft engine 10 comprises at least one first free turbine 16 rotating the first output kinematic linkage 17 and, for example, fastened to a shaft or the like of the first output kinematic linkage 17. The first output kinematic linkage 17 may extend at least partially out of the first turboshaft engine 10 and may comprise at least one shaft, at least one mechanical connector, at least one bearing, etc.

The second turboshaft engine 20 usually comprises a second gas generator 21 provided with at least one second compressor 22 connected by a second inner shaft 25 to at least one second high-pressure turbine 24. The second gas generator 21 further comprises a second combustion chamber 23 fluidly interposed between the second compressor 22 and the second high-pressure turbine 24. The second combustion chamber 23 is connected to a fuel supply network comprising a second fuel metering valve 28. The second fuel metering valve 28 may be controlled by a second engine computer 29. In addition, the second turboshaft engine 20 comprises at least one second free turbine 26 rotating the second output kinematic linkage 27 and, for example, fastened to a shaft or the like of the second output kinematic linkage 27. The second output kinematic linkage 27 may extend at least partially out of the second turboshaft engine 20 and may comprise at least one shaft, at least one mechanical connector, at least one bearing, etc.

Optionally, the first engine computer 19 and the second engine computer 29 may form two sub-assemblies of the same computer, for example including different code segments stored in the same computer.

Reference can be made to the literature, if necessary, for a more detailed description of such an installation.

In addition, the rotorcraft 1 comprises an assistance system 80 for implementing the method of the disclosure.

The assistance system 80 comprises an output electric machine 40 operating on request at least in electrical energy generator mode or indeed also in motor mode. Such an output electric machine 40 may thus be in the form of an alternator or a starter-generator, for example.

The output electric machine 40 is connected to the first output kinematic linkage 17 by a kinematic linkage 43 so as to be able to be set in motion by the first output kinematic linkage 17 when the electrical energy generator mode is engaged. In this case, the output electric machine 40 produces electrical energy 70, illustrated by an arrow in FIG. 1, transmitted to an electrical network 60. When the output electric machine 40 can operate in motor mode, the output electric machine 40 can help set the first output kinematic linkage 17 in motion. By way of example, the output electric machine 40 may include an output secured to a terminal pinion 41, the terminal pinion 41 meshing with a wheel 42 secured to a shaft of the first output kinematic linkage 17.

The assistance system 80 comprises an input electric machine 55 operating on request at least in motor mode, or indeed also in electrical energy generator mode. Such an input electric machine 55 may thus comprise an electric motor, or indeed a starter-generator, for example.

The input electric machine 55 is connected by an input kinematic linkage 58 to the second gas generator 21 of the second turboshaft engine 20, for example to a second compressor 22 or to the second inner shaft 25.

The input electric machine 55 is thus connected to the second gas generator 21 in order to help set the second gas generator 21 in motion when the motor mode is engaged. When the electrical energy generator mode is optionally engaged, the input electric machine 55 produces electrical energy transmitted to the electrical network 60. By way of example, the input electric machine 55 may include an output secured to a terminal pinion 56, the terminal pinion 56 meshing with a wheel 57 secured to the second inner shaft 25.

The electrical network 60 may in particular comprise an electrical connection 61 electrically connecting the output electric machine 40 and the input electric machine 55 so that at least a portion 71, illustrated by an arrow, of the electrical energy 70 produced by the output electric machine 40, supplies the input electric machine 55 with electricity.

According to a possibility compatible with the preceding possibility, the electrical network 60 may comprise at least one storage device 65 capable of storing, in particular, at least a portion of said electrical energy 70, such as an electric battery, for example. The electrical network 60 may comprise various conventional means for circulating electrical energy 70 within the electrical network 60 to the input electric machine 55 and/or the storage device 65, as desired, such as at least one switch, for example.

Optionally, the first turboshaft engine 10 may comprise an additional input electric machine 45 operating on request at least in motor mode. Such an additional input machine 45 may thus comprise an electric motor, or indeed a starter-generator, for example.

The additional input machine 45 is thus connected to the first gas generator 11 by a kinematic linkage 48 in order help set the first gas generator 11 in motion when the motor mode is engaged. When the electrical energy generator mode is optionally engaged, the additional input machine 45 produces electrical energy transmitted to the electrical network 60. By way of example, the additional input machine 45 comprises an output secured to a terminal pinion 46, the terminal pinion 46 meshing with a wheel 47 secured to the first inner shaft 15.

Optionally, an additional output electric machine 50 operating at least in electrical energy generator mode is driven by the second output kinematic linkage 27 via a connecting kinematic linkage 53. Such an additional output machine 50 may thus be in the form of an alternator or a starter-generator, for example.

The additional output machine 50 is connected to the second output kinematic linkage 27 by the connecting kinematic linkage 53 so as to be able to be set in motion by the second output kinematic linkage 27 when the electrical energy generator mode is engaged. In this case, the additional output machine 50 produces electrical energy transmitted to the electrical network 60. When the additional output machine 50 can operate in motor mode, the additional output machine 50 can help set the second output kinematic linkage 27 in motion. By way of example, the additional output machine 50 comprises an output secured to a terminal pinion 51, the terminal pinion 51 meshing with a wheel 52 secured to a shaft of the second output kinematic linkage 27.

Furthermore, the electrical network 60 may in particular comprise an electrical connection 62 electrically connecting the additional output machine 50 and the additional input machine 45.

In this case, each turboshaft engine may represent the first turboshaft engine or the second turboshaft engine of the installation.

Furthermore, the assistance system 80 includes a controller 30 controlling the various machines 40, 45, 50, 55 and the above-mentioned fuel metering valves 18, 28, or indeed at least one component of the electrical network for applying the method of the disclosure.

The controller 30 may comprise one or more units. Thus, the controller 30 may comprise the first engine computer 19 and/or the second engine computer 29 and/or another computer 31 according to the example shown.

By way of example, each computer may comprise at least one processor and at least one memory, at least one integrated circuit, at least one programmable system, or at least one logic circuit, these examples not limiting the scope to be given to the term "computer". The term "processor" may refer equally to a central processing unit (CPU), a graphics processing unit (GPU), a digital signal processor (DSP), a microcontroller, etc.

Figure 2:
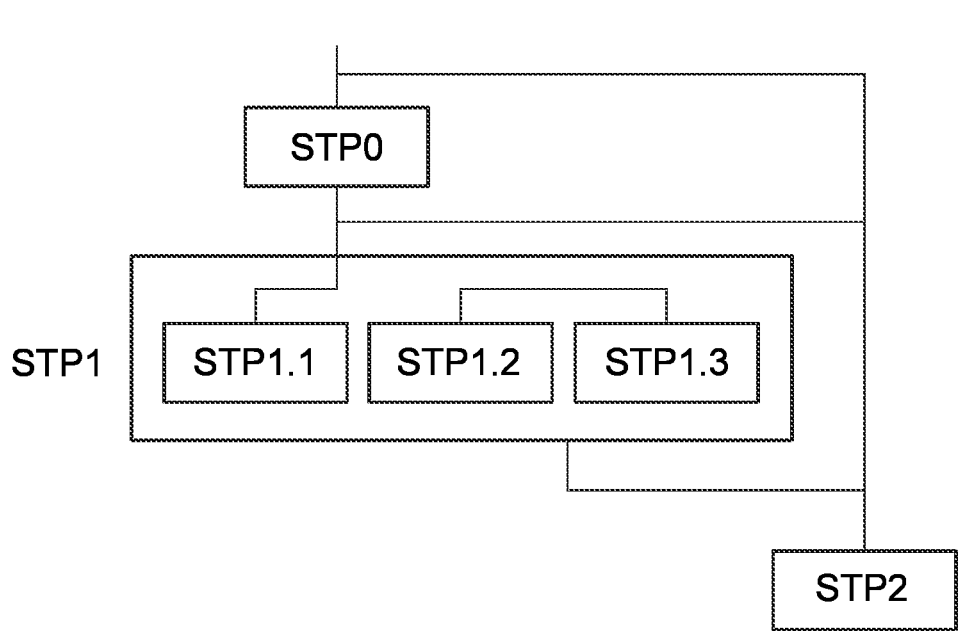
FIG. 2 is a diagram showing the method of the disclosure.

With reference to FIG. 2, the method comprises a phase STP1 with optimized specific fuel consumption. The phase STP1 with optimized specific fuel consumption may be initiated following a request made via a human-machine interface, the interface generating a signal transmitted to the controller 30 to request its implementation. The phase STP1 with optimized specific fuel consumption can also be initiated when predetermined conditions are fulfilled. For example, the controller 30 may be in communication with at least one sensor for this purpose. By way of illustration, the controller 30 may receive a signal carrying the forward speed of the rotorcraft 1 and a signal carrying the altitude of the rotorcraft 1, the controller 30 automatically implementing the phase STP1 with optimized specific fuel consumption if the forward speed is greater than a stored speed threshold and if the altitude is constant within a margin, for example for a predetermined time period.

The phase STP1 with optimized specific fuel consumption comprises the following steps, which steps can be carried out simultaneously or one after another, and not necessarily in the order described.

Thus, the phase STP1 with optimized specific fuel consumption includes a step STP1.1 of supplying fuel to the first turboshaft engine 10 in order to supply a first non-zero power to the common kinematic linkage 5. The first power may have value stored in the controller 30, a value corresponding to a stored percentage of the power required to set the common kinematic linkage in motion, a value equal to the previously reached value, etc.

The controller 30 thus controls the first fuel metering valve 18 such that the first turboshaft engine 10 supplies a high output power POPT to the first output kinematic linkage 17. By way of illustration, and according to one example, the controller 30 controls the first fuel metering valve 18 to reach a predetermined high output power POPT. According to another example, the controller 30 controls the first fuel metering valve 18 so that the first fuel metering valve 18 is placed in a predetermined position corresponding to the desired high output power POPT. The first fuel metering valve 18 supplies fuel to the first gas generator at a flow rate that is not zero, and that is different from a flow rate that causes the first turboshaft engine to start idling.

By way of illustration, according to the example of FIG. 1, the computer 31 transmits a signal to the first computer 19 that in turn controls the first fuel metering valve 18 by applying at least one predetermined rule.

Figure 3:
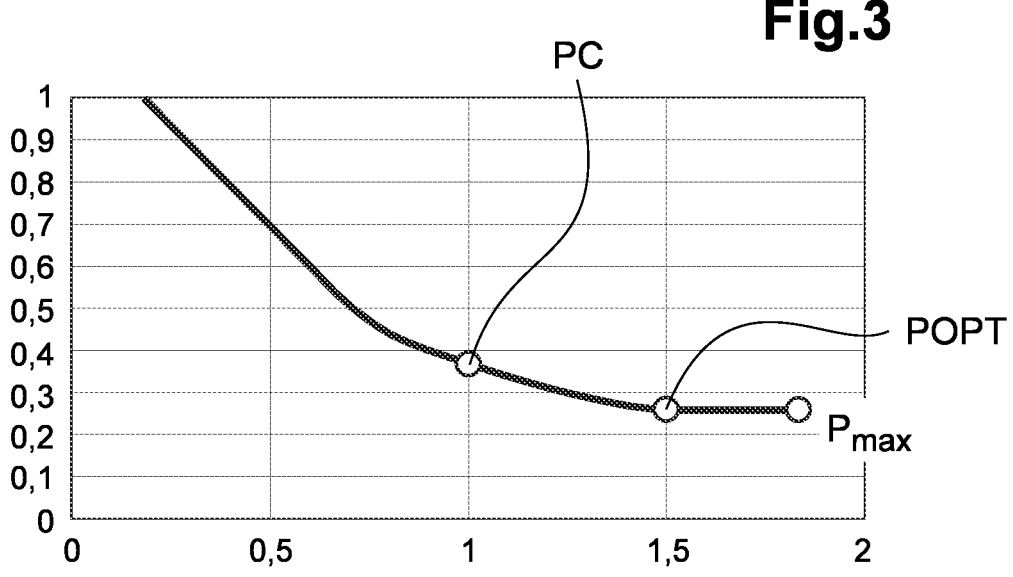
FIG. 3 is a diagram showing a specific fuel consumption saving.

FIG. 3 shows a diagram comprising, on the X-axis, the power generated by the first turboshaft engine 10 and, on the Y-axis, the specific fuel consumption of the first turboshaft engine 10. Compared with a power PC typically supplied by a system of the prior art, the first turboshaft engine 10 can be controlled such that the high output power POPT is closer to the maximum power PMAX that can be generated. The specific fuel consumption of the first turboshaft engine 10 is then optimized, or even minimal, if the output power POPT is equal to the maximum power PMAX according to the example.

Furthermore, the phase STP1 with optimized specific fuel consumption comprises a step STP1.2 of operating the output electric machine 40 in electrical energy generator mode in order to generate electrical energy.

For example, the computer 31 transmits a control signal to the output electric machine 40 to command it to operate in electrical energy generator mode. A portion of the high output power POPT supplied by the first turboshaft engine 10 is then converted into electrical energy 70 injected into the electrical network 60.

Conversely, the input electric machine of the turboshaft engine acting as the first turboshaft engine may not be active, i.e., it does not operate in electrical energy generator mode, or even in motor mode.

According to one possibility, the first power may be equal to the original power supplied to said common kinematic linkage 5 by the first turboshaft engine 10 during the phase STP0 that precedes the phase STP1 with optimized specific fuel consumption. All the additional power supplied by the first turboshaft engine 10 is then taken up by the output electric machine 40. With regard to the common kinematic linkage 5, the first turboshaft engine 10 supplies the same power.

According to another aspect, the phase STP1 with optimized specific fuel consumption includes a step STP1.3 of supplying fuel to the second turboshaft engine 20 and, in addition, a step of operating the input electric machine 55 in motor mode.

The controller 30 thus transmits a control signal to the input electric machine 55 to request it to operate in motor mode and controls the second fuel metering valve 28 to reduce the flow rate of fuel transmitted to the second turboshaft engine 20. At least a portion 71 or even all of the electrical energy 70 produced by the output electric machine 40 is transmitted directly or indirectly to said input electric machine 55.

The second turboshaft engine 20 is therefore not on standby but actively helps set the common kinematic linkage 5 in motion.

According to one possibility, the second power is equal to an initial power supplied to said common kinematic linkage 5 by the second turboshaft engine 20 during the phase STP0 that precedes the phase STP1 with optimized specific fuel consumption. According to one example, the output electric machine 40 may provide a predetermined power, the second fuel metering valve being controlled such that the second turboshaft engine provides said second power to the common kinematic linkage.

As a result, the common kinematic linkage 5 is set in motion jointly by the first turboshaft engine 10 and said second turboshaft engine 20 during the phase STP1 with optimized specific fuel consumption.

According to one possibility, the method may further include an assistance phase STP2 that is separate from the phase STP1 with optimized specific fuel consumption. During such an assistance phase STP2, at least one of the electric machines 40, 55 and the additional machines 45, 50 operates in motor mode to provide additional power.

For example, the output electric machine 40 operates in motor mode.

Such an assistance phase STP2 may be initiated at the request of a pilot by means of a human-machine interface or else by the controller 30 in predetermined conditions.

Naturally, the present disclosure is subject to numerous variations as regards its implementation. Although several embodiments are described above, it should readily be understood that it is not conceivable to identify exhaustively all the possible embodiments. It is naturally possible to replace any of the means described with equivalent means without going beyond the ambit of the present disclosure and the claims.

What is claimed is:

1. A method for controlling at least a first turboshaft engine and a second turboshaft engine of a rotorcraft that set a common kinematic linkage in motion respectively via a first output kinematic linkage and a second output kinematic linkage, the first turboshaft engine having a first free turbine connected to the first output kinematic linkage, the rotorcraft having an output electric machine operating on request at least in electrical energy generator mode, the output electric machine in the electrical energy generator mode being driven by the first output kinematic linkage, the rotorcraft having an input electric machine operating on request at least in motor mode, the input electric machine being connected by an input kinematic linkage to a gas generator of the second turboshaft engine, and the input electric machine in the motor mode driving the input kinematic linkage to drive the second turboshaft engine, wherein the method comprises a phase with optimized specific fuel consumption comprising the following steps:

supplying a first flow rate of fuel to the first turboshaft engine in order for the first turboshaft engine to generate a high power and to supply therefrom a first non-zero power to the common kinematic linkage, the high power being a sum of the first non-zero power and a remaining portion of the high power, the first flow rate of fuel being greater than an original flow rate of fuel supplied to the first turboshaft engine prior to an initiation of the phase with optimized specific fuel consumption, the original flow rate of fuel having been supplied to the first turboshaft engine in order for the first turboshaft engine to generate an original power and supply the original power to the common kinematic linkage prior to the initiation of the phase with optimized specific fuel consumption, the first non-zero power being equal to the original power, the output electric machine being inactive prior to the initiation of the phase with optimized specific fuel consumption;

operating the output electric machine in the electrical energy generator mode in order for the output electric machine to take off the remaining portion of the high power and to generate therefrom electrical energy; and supplying a second flow rate of fuel to the second turboshaft engine and operating the input electric machine in the motor mode in order for the second turboshaft engine in conjunction with the input electric machine to supply a second non-zero power to the common kinematic linkage, the second flow rate of fuel being less than an initial flow rate of fuel supplied to the second turboshaft engine prior to the initiation of the phase with optimized specific fuel consumption, the initial flow rate of fuel having been supplied to the second turboshaft engine in order for the second turboshaft engine to generate an initial power and supply the initial power to the common kinematic linkage prior to the initiation of the phase with optimized specific fuel consumption, the second non-zero power being equal to the initial power, the input electric machine being inactive prior to the initiation of the phase with optimized specific fuel consumption.

2. The method according to claim 1,
wherein the common kinematic linkage is set in motion jointly by the first turboshaft engine and the second turboshaft engine during the phase with optimized specific fuel consumption.

3. The method according to claim 1,
wherein, during the operation of the input electric machine in the motor mode, at least a portion of the electrical energy from the output electric machine supplies the input electric machine with electricity.

4. The method according to claim 1,
wherein, the output electric machine being able to operate in the motor mode, the method comprises an assistance phase that is separate from the phase with optimized specific fuel consumption during which the output electric machine operates in motor mode.

5. The method according to claim 1,
wherein, during the phase with optimized specific fuel consumption, neither of the first and the second turboshaft engines are idling.

6. A rotorcraft provided with at least a first turboshaft engine and a second turboshaft engine that set a common kinematic linkage in motion respectively via a first output kinematic linkage and a second output kinematic linkage, the first turboshaft engine having a first free turbine connected to the first output kinematic linkage, the common kinematic linkage setting at least one rotary wing in motion, the rotorcraft having an output electric machine operating on request at least in electrical energy generator mode, the output electric machine in the electrical energy generator mode being driven by the first output kinematic linkage, the rotorcraft having an input electric machine operating on request at least in motor mode, the input electric machine being connected by an input kinematic linkage to a gas generator of the second turboshaft engine, and the input electric machine in the motor mode driving the input kinematic linkage to drive the second turboshaft engine, wherein the rotorcraft comprises an assistance system configured to implement the method according to claim 1.

7. The rotorcraft according to claim 6,
wherein the first turboshaft engine comprises an additional input machine operating on request at least in the motor mode, the additional input machine being connected by an additional input kinematic linkage to a gas generator of the first turboshaft engine, and the second turboshaft engine comprises an additional output machine operating at least in the electrical energy generator mode, the additional output machine being driven by the second output kinematic linkage in the electrical energy generator mode.

8. The rotorcraft according to claim 7,
wherein the additional output machine is configured to operate in the motor mode.

9. The rotorcraft according to claim 6,
wherein the assistance system comprises:
a controller controlling the output electric machine and the input electric machine;
a first fuel metering valve commanded by the controller to supply fuel to the first turboshaft engine; and
a second fuel metering valve commanded by the controller to supply the fuel to the second turboshaft engine.

10. The method according to claim 1,
wherein all of the second non-zero power supplied to the common kinematic linkage is supplied by a combination of the second turboshaft engine and the input electric machine.

11. The method according to claim 10,
wherein all of the first non-zero power supplied to the common kinematic linkage is supplied by the first turboshaft engine.

12. The method according to claim 10,
wherein the second flow rate is less than the first flow rate.

13. The method according to claim 12,
wherein the first turboshaft engine has a first gas generator and the gas generator of the second turboshaft engine comprises a second gas generator, the first gas generator producing a first gas having a first temperature and the second gas generator producing a second gas having a second temperature, with the second temperature being less than the first temperature in the phase with optimized specific fuel consumption.

14. The method according to claim 1, wherein the first non-zero power is greater than the second non-zero power.

15. The method according to claim 1, wherein the high power is associated with a lower specific fuel consumption than a specific fuel consumption associated with the first non-zero power.

16. The method according to claim 1, wherein the high power is a maximum power of the first turboshaft engine.

17. The method according to claim 1, wherein a maximum power of the first turboshaft engine is greater than a maximum power of the second turboshaft engine.

18. The method according to claim 1, wherein the phase with optimized specific fuel consumption is automatically implemented while a forward speed of the rotorcraft is greater than a stored speed threshold and an altitude of the rotorcraft remains within a margin for a predetermined period of time.

* * * * *